(12) United States Patent
Karaki

(10) Patent No.: US 12,024,933 B2
(45) Date of Patent: Jul. 2, 2024

(54) PULLEY, AND WINDOW REGULATOR COMPRISING PULLEY

(71) Applicant: HI-LEX CORPORATION, Hyogo (JP)

(72) Inventor: Masakazu Karaki, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 0 days.

(21) Appl. No.: 18/007,055

(22) PCT Filed: Jul. 30, 2021

(86) PCT No.: PCT/JP2021/028234
§ 371 (c)(1),
(2) Date: Jan. 27, 2023

(87) PCT Pub. No.: WO2022/025223
PCT Pub. Date: Feb. 3, 2022

(65) Prior Publication Data
US 2023/0279711 A1   Sep. 7, 2023

(30) Foreign Application Priority Data

Jul. 31, 2020   (JP) ................................ 2020-130658

(51) Int. Cl.
*E05F 11/54*   (2006.01)
*E05F 11/48*   (2006.01)

(52) U.S. Cl.
CPC ....... *E05F 11/483* (2013.01); *E05Y 2201/668* (2013.01); *E05Y 2900/55* (2013.01)

(58) Field of Classification Search
CPC ..... E05F 11/483; E05F 11/485; E05F 15/689; E05Y 2201/668; E05Y 2900/55; B60J 1/17

(Continued)

(56) References Cited

U.S. PATENT DOCUMENTS 1,749,146 A * 3/1930 Maison ..................... F16H 7/18
                                                            492/30
5,058,322 A * 10/1991 Sambor ................. E05F 11/486
                                                            49/374

(Continued)

FOREIGN PATENT DOCUMENTS

JP   2001-513858 A   9/2001

OTHER PUBLICATIONS

International Search Report from International Application No. PCT/JP2021/028234 dated Sep. 14, 2021.

*Primary Examiner* — Jerry E Redman
(74) *Attorney, Agent, or Firm* — Shih IP Law Group, PLLC.

(57) ABSTRACT

A pulley includes a main winding portion including an annular main winding groove, where a wire is windable, formed between a first flange and a second flange; and an auxiliary winding portion including an auxiliary winding groove, where the wire is windable, formed between the second flange and a third flange. The auxiliary winding groove includes a closest portion closest to the main winding groove in the radial direction thereof, and a curved portion curved toward the main winding groove in a portion adjacent to the closest portion so that the curved portion joins the main winding groove at the closest portion. The third flange includes an auxiliary guide portion extending in the radial direction of the auxiliary winding groove so that the groove depth of the curved portion becomes larger than that of the closest portion. This structure can provide a pulley allowing easy winding of a wire.

5 Claims, 15 Drawing Sheets

(58) Field of Classification Search
USPC .......................................................... 49/352
See application file for complete search history.

(56) References Cited

U.S. PATENT DOCUMENTS

| | | |
|---|---|---|
| 6,282,839 B1 | 9/2001 | Fischer |
| 2020/0071981 A1* | 3/2020 | Beadle .................... F16N 15/02 |
| 2023/0279711 A1* | 9/2023 | Karaki ....................... B60J 1/17 |
| | | 49/352 |

* cited by examiner

PULLEY, AND WINDOW REGULATOR COMPRISING PULLEY

TECHNICAL FIELD

The present invention relates to a pulley and a window regulator including the pulley.

BACKGROUND ART

In a window regulator configured to raise and lower a window glass of a vehicle, for example, a pulley is used to change the extending direction of a wire that is used for raising and lowering the window glass. For easily winding a wire around a pulley during the assembling of a window regulator, a pulley described in Patent Literature (hereinafter, referred to as PTL) 1 is, for example, used. The pulley includes a supporting groove, an assembly groove having a diameter smaller than that of the bearing groove, and a transition area connecting the supporting groove with the assembly groove. In this pulley, the following is intended: the wire is temporarily wound around the assembly groove, and then the pulley is rotated, thereby bringing the wire from the assembly groove through the transition area to be wounded around the supporting groove. For achieving the configuration, the outer flange, which forms the assembly groove located at the portion corresponding to the transition area, projects axially toward the transition area in such a way that the wire is guided from the assembly groove through the transition area to the supporting groove.

CITATION LIST

Patent Literature

PTL 1
Japanese Unexamined Patent Application Publication (Translation of PCT Application) No. 2001-513858

SUMMARY OF INVENTION

Technical Problem

The pulley of PTL 1 has a substantially constant groove depth in the region from the assembly groove to the transition area. Therefore, when the pulley is rotated to guide the wire from the assembly groove through the transition area to the supporting groove, the wire get over the flange portion protruding toward the transition area in some cases. In such a case, the wire is separated from the assembly groove and it becomes difficult to wind the wire around the supporting groove.

An object of the present invention is to provide a pulley that allows easy winding of a wire and a window regulator including the pulley.

Solution to Problem

A pulley of the present invention around which a wire is windable and which is rotatable about a rotation axis includes: a main winding portion including a first flange, a second flange, and a main winding groove in an annular shape formed between the first flange and the second flange, where the wire is windable around the main winding groove; and an auxiliary winding portion including the second flange, a third flange, and an auxiliary winding groove in an annular shape formed between the second flange and the third flange, where the wire is windable around the auxiliary winding groove, and the auxiliary winding groove has a total peripheral length shorter than that of the main winding groove, in which the auxiliary winding groove includes a closest portion that is closest to the main winding groove in a radial direction of the main winding groove; in a portion adjacent to the closest portion of the auxiliary winding groove, the auxiliary winding groove extends inward in the radial direction of the main winding groove as a distance from the closest portion increases; the auxiliary winding groove further includes a curved portion that is curved toward the main winding groove in the portion adjacent to the closest portion in such a way that the curved portion joins the main winding groove at the closest portion; and the third flange includes an auxiliary guide portion extending in a radial direction of the auxiliary winding groove in such a way that a groove depth of the curved portion becomes larger than a groove depth of the closest portion.

A window regulator of the present invention includes a drive section; a wire to be driven by the drive section; a moving member to which the wire is connected and a window glass is attachable; a guide rail for guiding the moving member; and the pulley rotatably attached to the guide rail and around which the wire is wound.

Advantageous Effects of Invention

The present invention is capable of providing a pulley that allows easy winding of a wire and a window regulator including the pulley.

DESCRIPTION OF EMBODIMENTS

Hereinafter, a pulley and a window regulator according to an embodiment of the present invention will be described with reference to the drawings. The embodiment shown below is merely an example, and the pulley and the window regulator of the present invention are not limited to the following embodiment.

Figure 1:
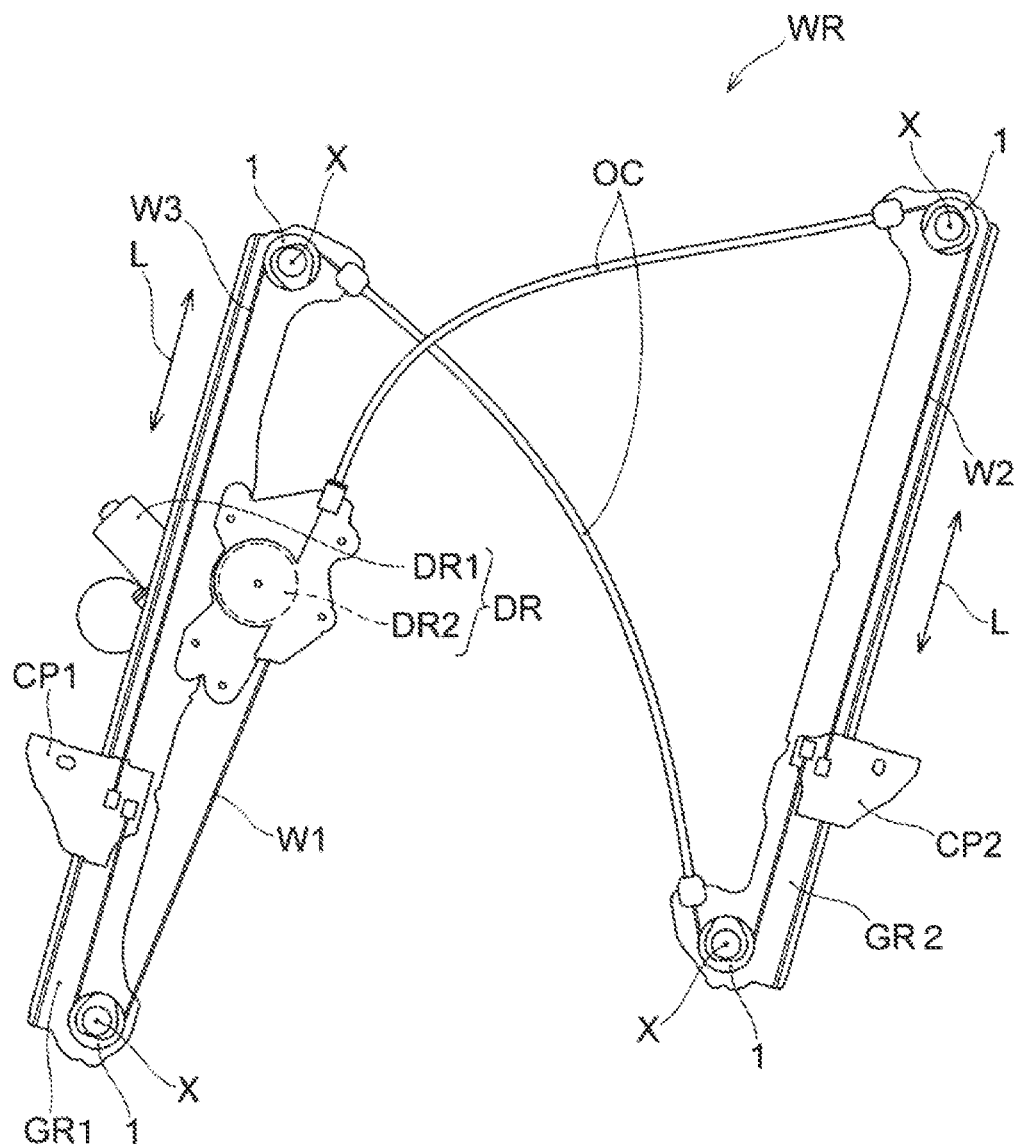
FIG. 1 is an overall view illustrating a window regulator including a pulley according to an embodiment of the present invention.

As illustrated in FIG. 1, wires W1, W2, and W3 (hereinafter, collectively referred to as "wire W") are windable around pulley 1 of the present embodiment. Pulley 1 is a member configured to change the extending direction of wound wire W. Pulley 1 can be applied to, for example, window regulator WR configured to raise and lower a window glass of a vehicle, as illustrated in FIG. 1. In the following, the details of pulley 1 will be described with reference to an exemplary pulley applied to window regulator WR. The pulley of the present invention is applicable not only to a window regulator, but also to other applications in which a wire is wound and the extending direction of the wire needs to be changed.

As illustrated in FIG. 1, window regulator WR includes drive section DR; wire W to be driven by drive section DR; moving members CP1 and CP2 to which wire W is connected and a window glass (not illustrated) can be attached; guide rails GR1 and GR2 for guiding moving members CP1 and CP2; and pulleys 1 rotatably attached to guide rails GR1 and GR2 and around which wire W is wound. Window regulator WR raises and lowers the window glass attached to moving members CP1 and CP2 by raising and lowering moving members CP1 and CP2 in raising and lowering direction L along guide rails GR1 and GR2 with the use of wire W driven by drive section DR. Window regulator WR is, for example, attached to an attachment target such as a door panel (not illustrated) of a vehicle. In the following description, the upper side of raising and lowering direction L of the window glass is referred to as "upper," "upward," or "upper side," and the lower side of raising and lowering direction L of the window glass is referred to as "lower," "downward," or "lower side."

Wire W transmits the driving force of drive section DR to moving members CP1 and CP2, namely the operation targets. For transmitting the driving force of drive section DR to moving members CP1 and CP2, wire W is routed to drive section DR, moving members CP1 and CP2, and guide rails GR1 and GR2 along a predetermined route. Any route is applicable for wire W, so long as wire W can transmit the driving force of drive section DR to moving members CP1 and CP2. In the present embodiment, wire W is routed so as to form a loop with a shape of figure eight, as illustrated in FIG. 1. Wire W is configured as a flexible elongated member so that wire W can be routed along a predetermined route. As wire W, for example, an inner cable of a known control cable, in which a plurality of metal wires are twisted, can be used. As illustrated in FIG. 1, wire W may be inserted through outer casing OC, which can slidably house wire W in the length direction of wire W, at least in a part of the route.

In the present embodiment, wire W includes three wires, namely first wire W1, second wire W2, and third wire W3, as illustrated in FIG. 1. The number of wires is not limited to three, and may be one, two, or four or more. First wire W1, second wire W2, and third wire W3 are connected to each other via drive section DR and moving members CP1 and CP2, and routed so as to form a loop with a shape of figure eight as described above.

As illustrated in FIG. 1, the detail of the routing is as follows. One (first) end of first wire W1 is connected to drive section DR, and the other (second) end of first wire W1 is connected to first moving member CP1. First wire W1 extends from drive section DR to the lower end side of first guide rail GR1, the direction of first wire W1 is changed by pulley 1 provided on the lower end side of first guide rail GR1, and first wire W1 extends upward along first guide rail GR1 to first moving member CP1. One (first) end of second wire W2 is connected to drive section DR, and the other (second) end of second wire W2 is connected to second moving member CP2. Second wire W2 extends from drive section DR to the upper end side of second guide rail GR2, the direction of second wire W2 is changed by pulley 1 provided on the upper end side of second guide rail GR2, and second wire W2 extends downward along second guide rail GR2 to second moving member CP2. One (first) end of third wire W3 is connected to first moving member CP1, and the other (second) end of third wire W3 is connected to second moving member CP2. Third wire W3 extends upward from first moving member CP1 along first guide rail GR1, the direction of third wire W3 is changed by pulley 1 provided on the upper end side of first guide rail GR1, and third wire W3 extends to the lower end side of second guide rail GR2. Further, the direction of third wire W3 is changed by pulley 1 provided on the lower end side of second guide rail GR2, and third wire W3 extends upward along second guide rail GR2 to second moving member CP2.

Moving members CP1 and CP2 are raised and lowered in raising and lowering direction L along guide rails GR1 and GR2 by the driving force transmitted by wire W. The raising and lowering of moving members CP1 and CP2 in raising and lowering direction L along guide rails GR1 and GR2 raises and lowers the window glass attached to moving members CP1 and CP2 in raising and lowering direction L along guide rails GR1 and GR2. Moving members CP1 and CP2 are attached to guide rails GR1 and GR2 so as to be movable along raising and lowering direction L. In the present embodiment, moving members CP1 and CP2 include two moving members, namely first moving member CP1 and second moving member CP2, as illustrated in FIG. 1. First moving member CP1 and second moving member CP2 are attached to guide rails GR1 and GR2 in such a way that the moving members move in conjunction and in parallel with each other. The number of moving members is not limited to two, and may be one or three or more.

Moving members CP1 and CP2 are connected to wire W in such a way that the driving force along raising and lowering direction L is transmitted to the moving members, and the moving members move in conjunction with each other. Specifically, the second end of first wire W1 and the first end of third wire W3 are connected to first moving member CP1, and first moving member CP1 moves in the direction in which first wire W1 is pulled or in the direction in which third wire W3 is pulled. In addition, the second end of second wire W2 and the second end of third wire W3 are connected to second moving member CP2, and second moving member CP2 moves in the direction in which second wire W2 is pulled or in the direction in which third wire W3 is pulled.

Guide rails GR1 and GR2 guide moving members CP1 and CP2 in such a way that moving members CP1 and CP2 move along raising and lowering direction L. Guide rails GR1 and GR2 are, for example, attached to an attachment target such as a door panel (not illustrated) of a vehicle. In the present embodiment, guide rails GR1 and GR2 include two moving members, namely first guide rail GR1 and second guide rail GR2, as illustrated in FIG. 1. First guide rail GR1 guides first moving member CP1 along raising and lowering direction L, and second guide rail GR2 guides second moving member CP2 along raising and lowering direction L. In other words, first guide rail GR1 and second guide rail GR2 are disposed so as to guide first moving member CP1 and second moving member CP2 along the same raising and lowering direction L. The number of guide rails is not limited, and may be one.

Drive section DR drives wire W, which is directly or indirectly connected to drive section DR. Drive section DR may have any configuration, so long as drive section DR can drive wire W. In the present embodiment, drive section DR is fixed to first guide rail GR1 as illustrated in FIG. 1. In addition, drive section DR is configured to drive wire W, for example, electrically or manually. In the present embodiment, drive section DR drives wire W electrically. As illustrated in FIG. 1, drive section DR includes motor DR1 and drum DR2 rotated by the driving force of motor DR1.

Motor DR1 is a drive source for rotating drum DR2. In the present embodiment, motor DR1 is connected to drum DR2 via a known speed reduction mechanism and rotates drum DR2 in the forward and reverse directions. Drum DR2 is rotated in the forward and reverse directions by driving motor DR1 and thereby winding and feeding wound wire W (first wire W1 and second wire W2 in the example illustrated in FIG. 1). Drum DR2 winds wire W by rotating in one direction or the other direction to pull moving members CP1 and CP2 connected to wire W, and feeds wire W by rotating in one direction or the other direction to allow the movement of moving members CP1 and CP2 connected to wire W.

More specific description with reference to FIG. 1 is as follows: when motor DR1 is driven in drive section DR to rotate drum DR2 in one direction (for example, in the counterclockwise direction in FIG. 1), first wire W1 is wound around drum DR2 and second wire W2 is fed from drum DR2. As a result, first moving member CP1, to which first wire W1 is connected, is pulled downward in raising and lowering direction L by first wire W1. At the same time, second moving member CP2, to which third wire W3 is connected, is pulled downward in raising and lowering direction L via third wire W3 connected to first moving member CP1. At this time, second wire W2 connected to second moving member CP2 is pulled downward in raising and lowering direction L by second moving member CP2 and simultaneously is fed from drum DR2, thereby allowing the downward movement of second moving member CP2 in raising and lowering direction L. In this manner, first moving member CP1 and second moving member CP2 move downward in raising and lowering direction L in conjunction with each other.

On the other hand, when motor DR1 is driven in drive section DR to rotate drum DR2 in the other direction (for example, the clockwise direction in FIG. 1), second wire W2 is wound around drum DR2 and first wire W1 is fed from drum DR2. As a result, second moving member CP2, to which second wire W2 is connected, is pulled upward in raising and lowering direction L by second wire W2. At the same time, first moving member CP1, to which third wire W3 is connected, is pulled upward in raising and lowering direction L via third wire W3 connected to second moving member CP2. At this time, first wire W1 connected to first moving member CP1 is pulled upward in raising and lowering direction L by first moving member CP1 and simultaneously is fed from drum DR2, thereby allowing the upward movement of first moving member CP1 in raising and lowering direction L. In this manner, first moving member CP1 and second moving member CP2 move upward in raising and lowering direction L in conjunction with each other.

As illustrated in FIG. 1, pulley 1 is configured to be rotatable about rotation axis X, and rotates in accordance with the movement of wound wire W to change the extending direction of wire W. Pulley 1 is disposed in such a way that rotation axis X is parallel to the direction perpendicular to both of the extending directions of wire W before and after the direction thereof is changed. In the present embodiment, pulleys 1 are rotatably provided respectively at a total of four positions on the upper end sides and the lower end sides of both of first guide rail GR1 and second guide rail GR2. The number and positions of pulleys 1 are not limited to the illustrated example, and are appropriately set according to positions where the direction of wire W needs to be changed and the number of such positions. Pulleys 1 may thus be provided, for example, at one of the upper end sides or the lower end sides of guide rails GR1 and GR2.

Pulley 1 includes main winding portion 2 and auxiliary winding portion 3 as illustrated in FIGS. 2A, 2B, and 3A to 3F. Main winding portion 2 is a portion where wire W is wound and the extending direction of wire W is changed. Auxiliary winding portion 3 is a portion where wire W is temporarily wound. Auxiliary winding portion 3 assists temporarily-wound wire W to be wound around main winding portion 2. As described in detail below, after wire W is wound around auxiliary winding portion 3 in pulley 1, pulley 1 and wire W are rotated together or rotated relatively to each other about rotation axis X, thereby allowing wire W to be wound around main winding portion 2 from auxiliary winding portion 3. Main winding portion 2 and auxiliary winding portion 3 may have any configuration, so long as temporarily-wound wire W can be wound around main winding portion 2 from auxiliary winding portion 3. In the present embodiment, main winding portion 2 and auxiliary winding portion 3 are adjacent to each other in the rotation axis X direction and are substantially in parallel and connected to each other.

Main winding portion 2 includes first flange 21 and second flange 22 as illustrated in FIGS. 2A, 2B, and 3A to 3F. Annular main winding groove 23, where wire W is windable, is formed between first flange 21 and second flange 22 in main winding portion 2.

Main winding groove 23 is a groove where wire W is wound in order to change the direction of wire W. As illustrated in FIGS. 2A, 2B, and 3A to 3F, main winding groove 23 has a shape recessed inward in the radial direction with respect to the outer circumferences of first flange 21 and second flange 22. Main winding groove 23 is formed in a substantially annular shape about rotation axis X.

First flange 21 and second flange 22 prevent wire W from coming out from main winding groove 23 in the rotation axis X direction, and guide wire W along the extending direction of main winding groove 23. In order to guide wire W along the extending direction of main winding groove 23, each of first flange 21 and second flange 22 is provided along the extending direction of main winding groove 23 and on one of the side surfaces of main winding groove 23, as illustrated in FIGS. 2A, 2B, and 3A to 3F. The side surfaces of main winding groove 23 are located on both sides of main winding groove 23 each along the extending direction of main winding groove 23. First flange 21 and second flange 22 may have any shape, so long as wire W can be guided along the extending direction of main winding groove 23. In the present embodiment, first flange 21 is formed about rotation axis X in a substantially circular shape having a diameter larger than that of main winding groove 23 as illustrated in FIG. 3B. In addition, second flange 22 is formed about rotation axis X in a substantially circular shape having a diameter larger than that of main winding groove 23 as a whole as illustrated in FIG. 3A. As illustrated FIGS. 2A, 2B and 3D, in the vicinity of below-described closest portion 321 of auxiliary winding portion 3, second flange 22 is inclined toward first flange 21 in the rotation axis X direction while the diameter of second flange 22 is reduced as second flange 22 approaches closest portion 321 in the circumferential direction. In addition, second flange 22 is formed in such a way that the outer edge of second flange 22 in the radial direction is located at the same height as the bottom of main winding groove 23 at the position where second flange 22 is closest to closest portion 321 (second flange 22 substantially disappears). Herein, the term "bottom" means the lowest part of a groove.

Auxiliary winding portion 3 includes second flange 22 and third flange 31 as illustrated in FIGS. 2A, 2B, and 3A to 3F. Auxiliary winding portion 3 shares second flange 22 with main winding portion 2. Annular auxiliary winding groove 32, where wire W is windable, is formed between second flange 22 and third flange 31 in auxiliary winding portion 3.

Auxiliary winding groove 32 is a groove where wire W is temporarily wound for guiding wire W to main winding groove 23. As illustrated in FIGS. 2A, 2B, and 3A to 3F, auxiliary winding groove 32 has a shape that is at least partially recessed inward in the radial direction with respect to the outer circumferences of second flange 22 and third flange 31. Auxiliary winding groove 32 is formed in an annular shape in such a way that wire W can be wound.

In order to guide temporarily-wound wire W to main winding groove 23, auxiliary winding groove 32 is provided as follows as illustrated FIG. 3A: at least a part of auxiliary winding groove 32 joins main winding groove 23 in the radial direction of main winding groove 23. In addition, auxiliary winding groove 32 includes closest portion 321 that is closest to main winding groove 23 in the radial direction of main winding groove 23. In a portion adjacent to closest portion 321 in auxiliary winding groove 32, auxiliary winding groove 32 extends inward in the radial direction of main winding groove 23 as the distance from closest portion 321 increases in the circumferential direction. In the present embodiment, auxiliary winding groove 32 is formed in a substantially triangular and annular shape that is rounded in front view (when viewed in the rotation axis X direction), and a vertex of the substantially triangular shape joins main winding groove 23 in the radial direction to form closest portion 321, as illustrated in FIG. 3A. Auxiliary winding groove 32 is located inside main winding groove 23 in the radial direction and has a total peripheral length shorter than that of main winding groove 23. As a result, wire W, whose length is adjusted so that the wire can be wound around main winding groove 23, can be easily wound around auxiliary winding groove 32. Auxiliary winding groove 32 is not limited to the illustrated example, so long as at least a part of auxiliary winding groove 32 joins main winding groove 23 in the radial direction, and has a total peripheral length shorter than that of main winding groove 23. Auxiliary winding groove 32 may thus be formed, for example, in a substantially circular shape in front view.

Figure 2A:
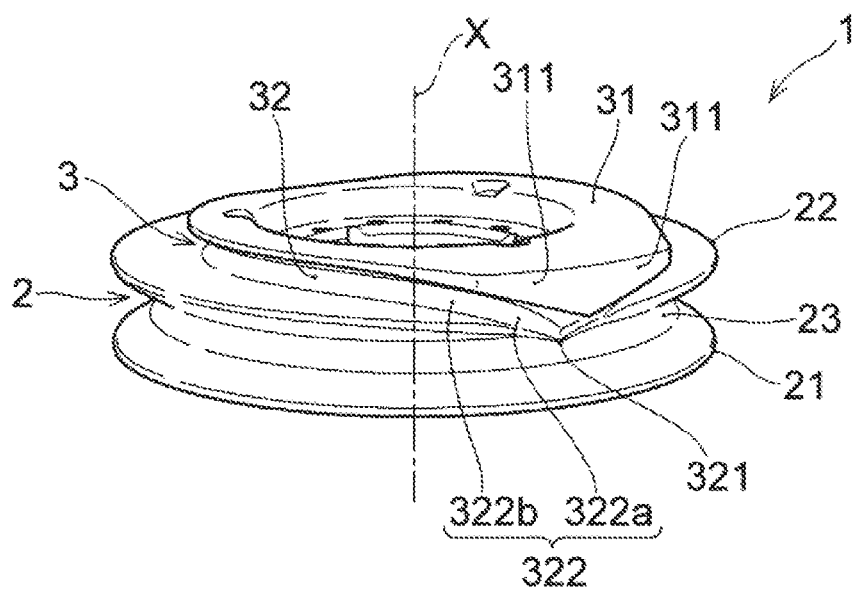
FIG. 2A is a perspective view of a pulley according to the embodiment of the present invention as viewed from diagonally above.
Figure 2B:
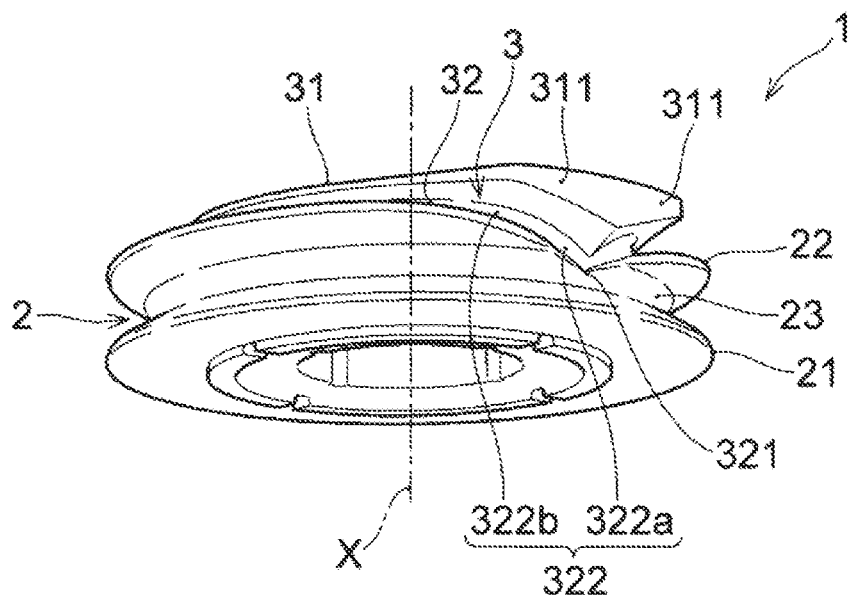
FIG. 2B is a perspective view of the pulley according to the embodiment of the present invention as viewed from diagonally below.
Figure 3A:
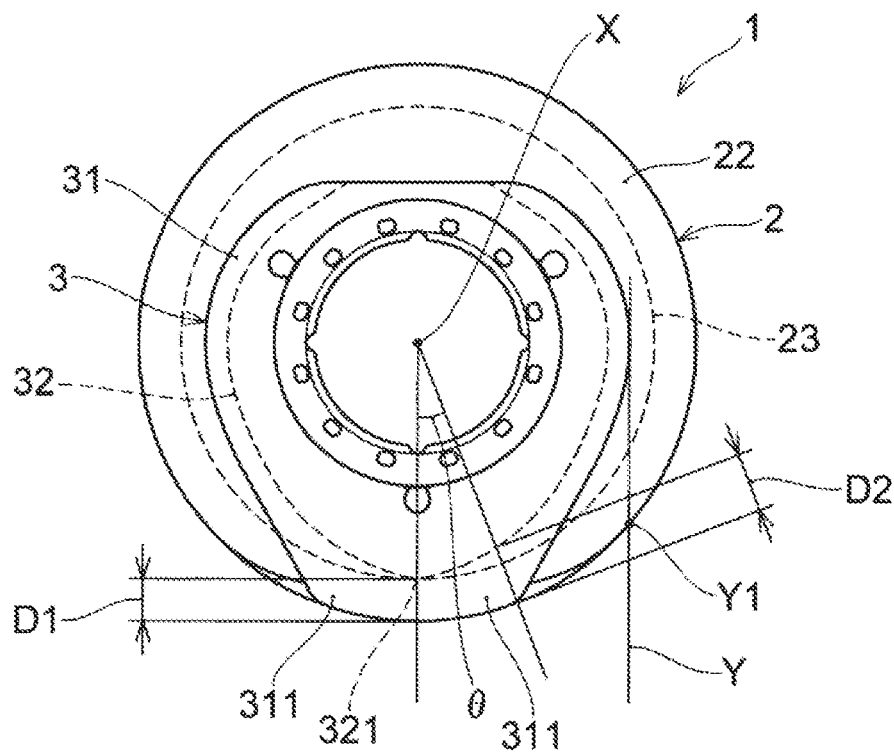
FIG. 3A is a front view of the pulley according to the embodiment of the present invention.
Figure 3B:
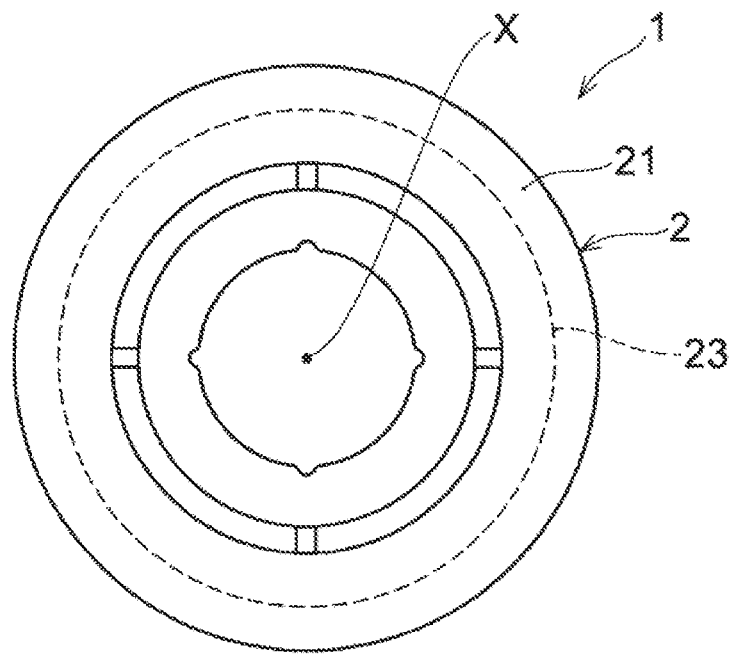
FIG. 3B is a rear view of the pulley according to the embodiment of the present invention.
Figure 3C:
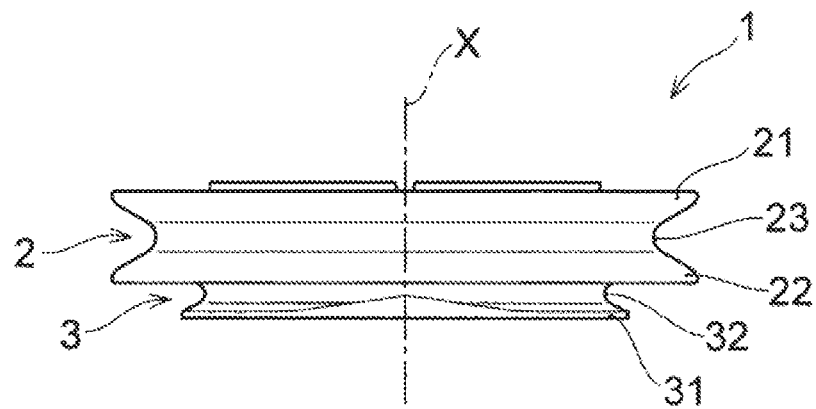
FIG. 3C is a plan view of the pulley according to the embodiment of the present invention.
Figure 3D:
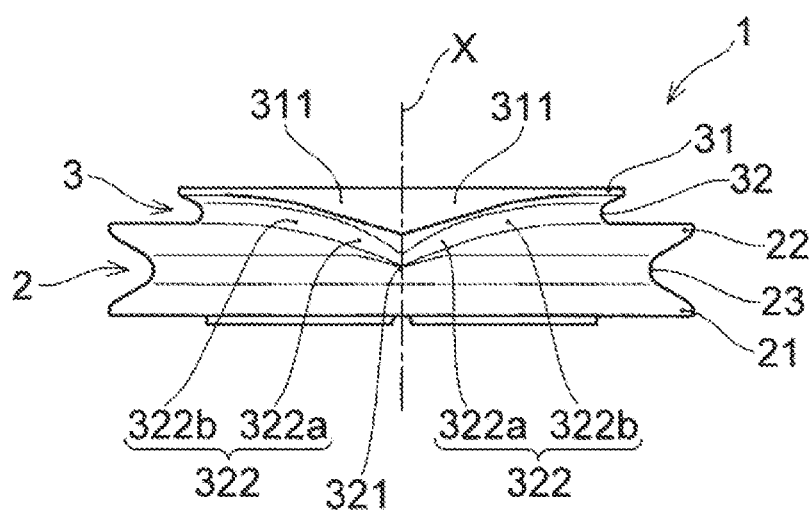
FIG. 3D is a bottom view of the pulley according to the embodiment of the present invention.

As illustrated in FIGS. 2A, 2B and 3D, auxiliary winding groove 32 includes curved portion 322 that is curved toward main winding groove 23 in a portion adjacent to closest portion 321 in such a way that the curved portion joins main winding groove 23 at closest portion 321. In the portion adjacent to closest portion 321, curved portion 322 curves toward main winding groove 23 in the rotation axis X direction as curved portion 322 approaches closest portion 321 in the circumferential direction. Curved portion 322 eventually joins main winding groove 23 at closest portion 321. As a result, curved portion 322 can guide temporarily-wound wire W from auxiliary winding groove 32 to main winding groove 23.

Curved portion 322 may have any structure, so long as curved portion 322 can guide wire W, which is temporarily wound around auxiliary winding groove 32, to main winding groove 23. In the present embodiment, curved portion 322 includes first curved portion 322a and second curved portion 322b as illustrated in FIGS. 2A, 2B and 3D. First curved portion 322a is adjacent to closest portion 321 in the circumferential direction of auxiliary winding groove 32, and second curved portion 322b is adjacent to first curved portion 322a on the side opposite to closest portion 321 in the circumferential direction of auxiliary winding groove 32. First curved portion 322a is curved with a curvature larger than that of second curved portion 322b. As a result, the curvature gradually increases from auxiliary winding groove 32 toward main winding groove 23, and thus wire W can be curved and wound around main winding groove 23 without receiving a large bending deformation when wire W is curved along curved portion 322 toward the rotation axis X direction.

Second flange 22 and third flange 31 prevent wire W from coming out from auxiliary winding groove 32 in the rotation axis X direction, and guide wire W along the extending direction of auxiliary winding groove 32. In order to guide wire W along the extending direction of auxiliary winding groove 32, each of second flange 22 and third flange 31 is provided along the extending direction of auxiliary winding groove 32 and on one of the side surfaces of auxiliary winding groove 32, as illustrated in FIGS. 2A, 2B, and 3A to 3F. The side surfaces are located on both sides of auxiliary winding groove 32 along the extending direction of auxiliary winding groove 32.

Second flange 22 may have any shape, so long as second flange 22 can prevent wire W from coming out from at least a part of auxiliary winding groove 32 to the side opposite to third flange 31 in the rotation axis X direction, and can guide wire W along the extending direction of auxiliary winding groove 32 toward main winding groove 23. In the present embodiment, second flange 22 is formed about rotation axis X in a substantially circular shape having a diameter larger than that of auxiliary winding groove 32 as a whole, as illustrated in FIG. 3A. As described above, second flange 22 has the following features as illustrated FIGS. 2A, 2B, and 3D: in the vicinity of closest portion 321 of auxiliary winding portion 3, second flange 22 is inclined toward first flange 21 in the rotation axis X direction while the diameter of second flange 22 is reduced as second flange 22 approaches closest portion 321 in the circumferential direction; and second flange 22 is formed in such a way that the outer edge of second flange 22 in the radial direction is located at the same height as the bottom of auxiliary winding groove 32 at the position where second flange 22 is closest to closest portion 321 (second flange 22 substantially disappears).

Third flange 31 may have any shape, so long as the third flange can prevent wire W from coming out from at least a part of auxiliary winding groove 32 to the outside of third flange 31 in the rotation axis X direction, and can guide wire W along the extending direction of auxiliary winding groove 32 toward main winding groove 23. In the present embodiment, third flange 31 is formed in a substantially triangular shape that is rounded in front view (when viewed in the rotation axis X direction), namely substantially corresponding to auxiliary winding groove 32, and is provided along the extending direction of auxiliary winding groove 32, as illustrated in FIG. 3A.

Figure 3E:
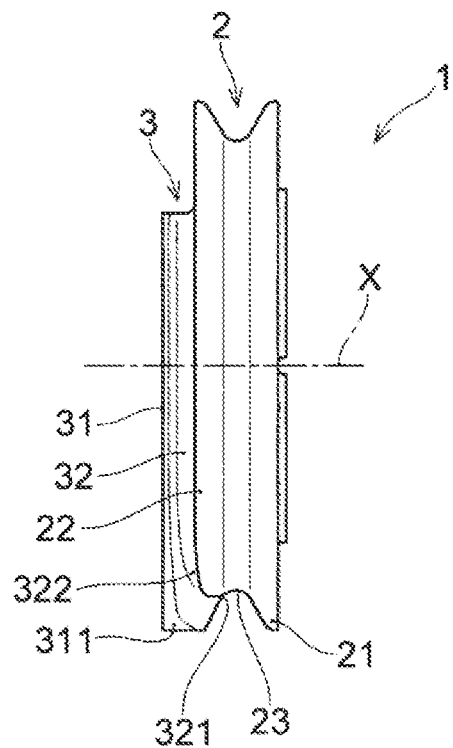
FIG. 3E is a right side view of the pulley according to the embodiment of the present invention.
Figure 3F:
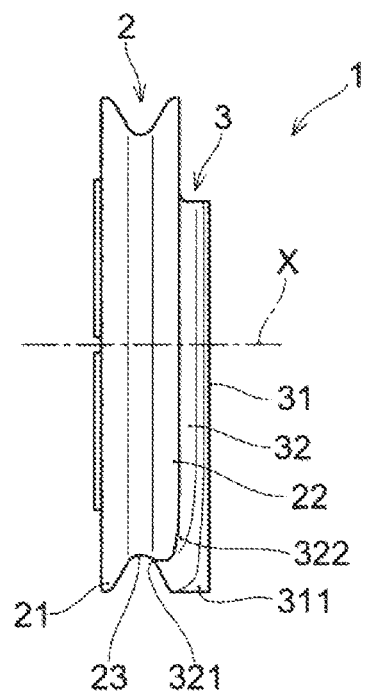
FIG. 3F is a left side view of the pulley according to the embodiment of the present invention.
Figure 4A:
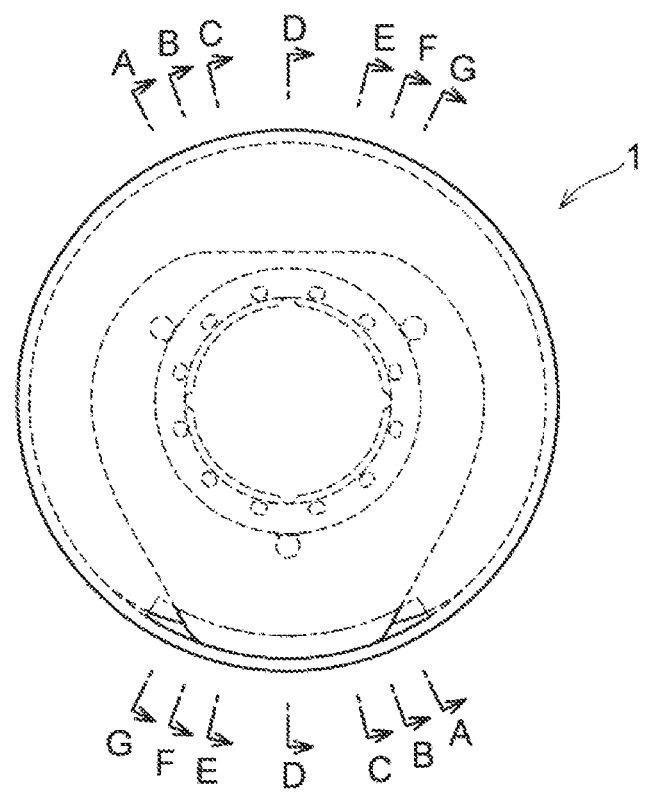
FIG. 4A is a front view of the pulley according to the embodiment of the present invention, indicating the characteristic portion of the pulley with a solid line.
Figure 4B:
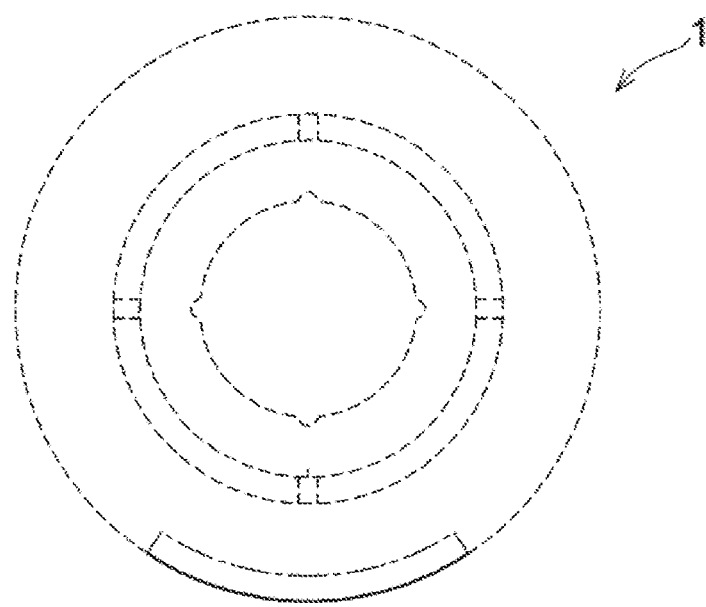
FIG. 4B is a rear view of the pulley according to the embodiment of the present invention, indicating the characteristic portion of the pulley with a solid line.
Figure 4C:
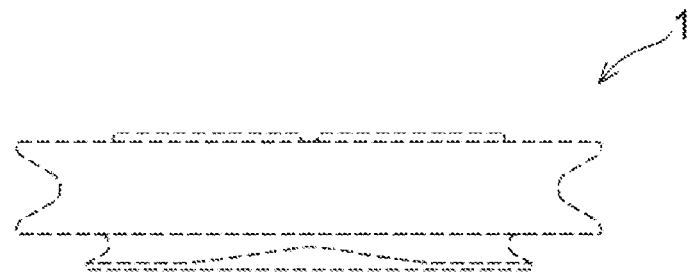
FIG. 4C is a plan view of the pulley according to the embodiment of the present invention, indicating the characteristic portion of the pulley with a solid line.
Figure 4D:
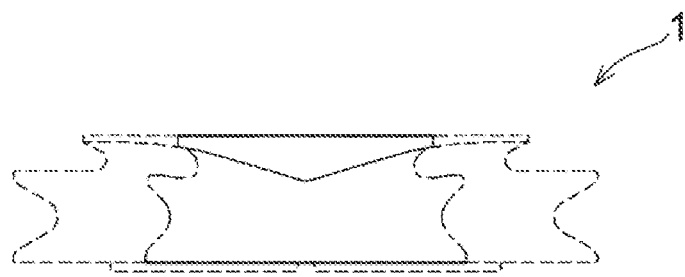
FIG. 4D is a bottom view of the pulley according to the embodiment of the present invention, indicating the characteristic portion of the pulley with a solid line.
Figure 4E:
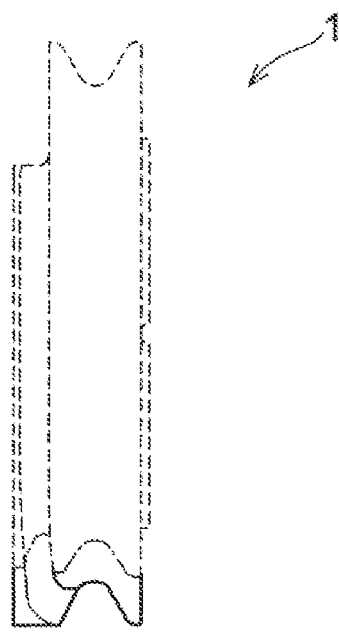
FIG. 4E is a right side view of the pulley according to the embodiment of the present invention, indicating the characteristic portion of the pulley with a solid line.
Figure 4F:
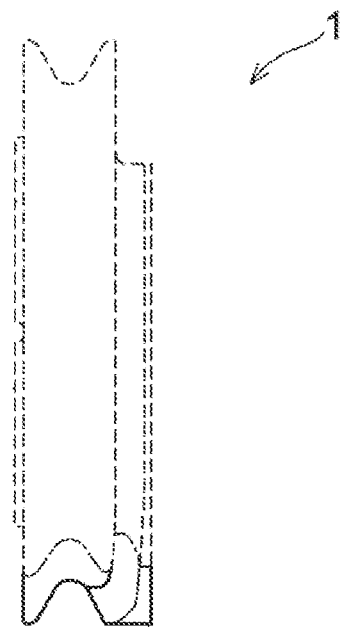
FIG. 4F is a left side view of the pulley according to the embodiment of the present invention, indicating the characteristic portion of the pulley with a solid line.
Figure 5A:
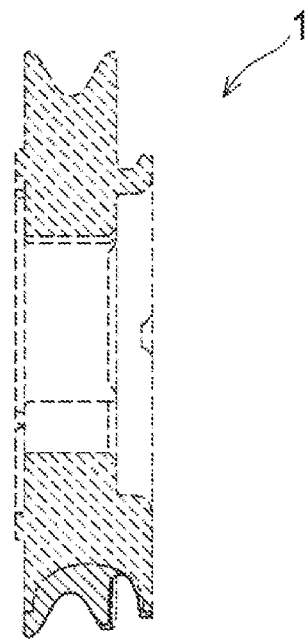
FIG. 5A is a cross-sectional view taken along line A-A of FIG. 4A.
Figure 5B:
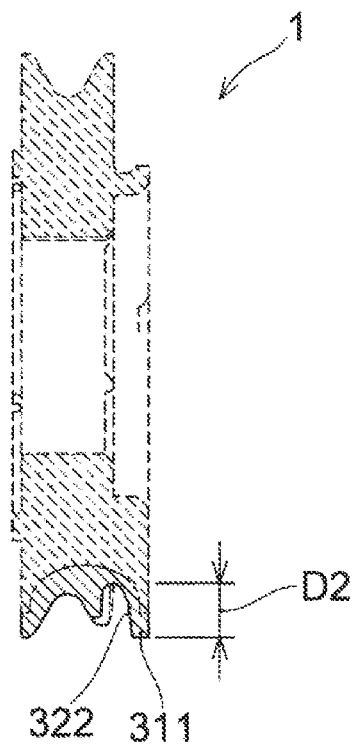
FIG. 5B is a cross-sectional view taken along line B-B of FIG. 4A.
Figure 5C:
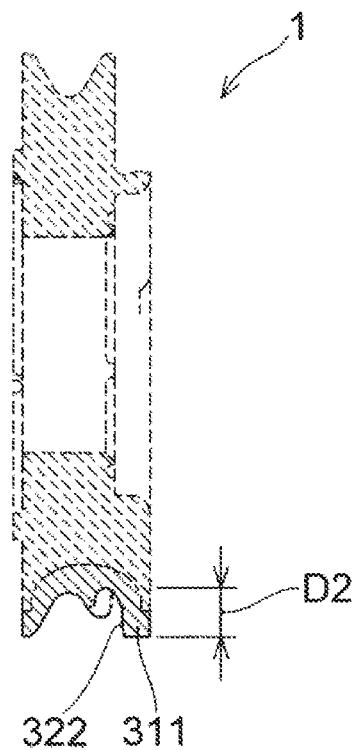
FIG. 5C is a cross-sectional view taken along line C-C of FIG. 4A.
Figure 5D:
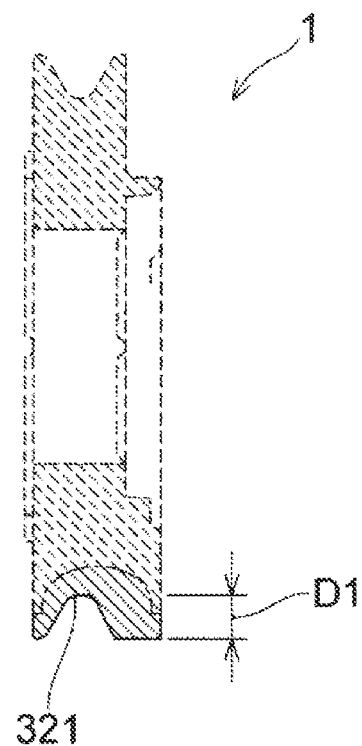
FIG. 5D is a cross-sectional view taken along line D-D of FIG. 4A.
Figure 5E:
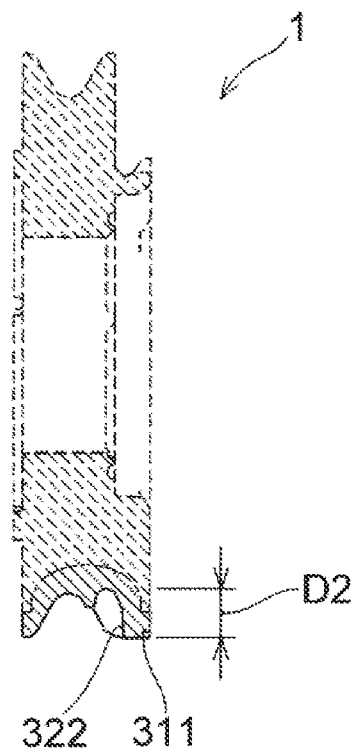
FIG. 5E is a cross-sectional view taken along line E-E of FIG. 4A.
Figure 5F:
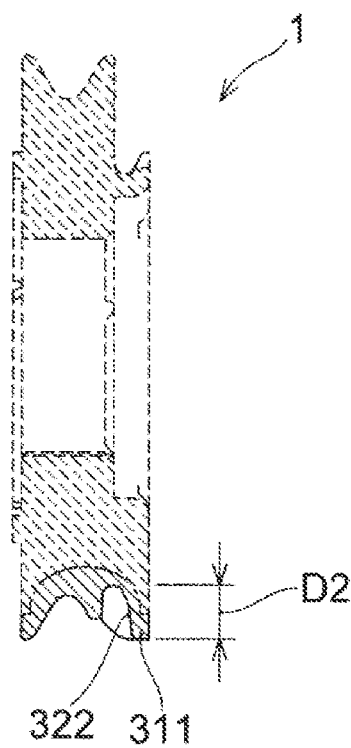
FIG. 5F is a cross-sectional view taken along line F-F of FIG. 4A.
Figure 5G:
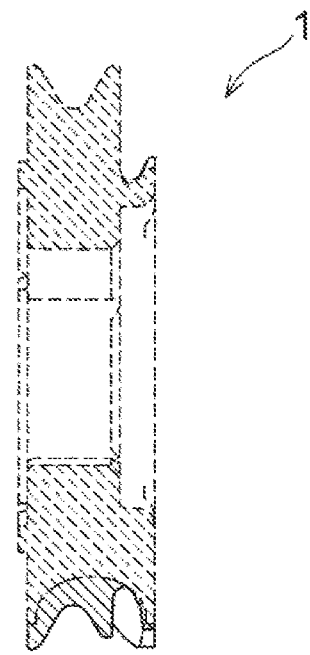
FIG. 5G is a cross-sectional view taken along line G-G of FIG. 4A.

In the present embodiment, in the vicinity of closest portion 321 of auxiliary winding portion 3, the surface of third flange 31 on the second flange 22 side is curved toward first flange 21 in the rotation axis X direction as third flange 31 approaches closest portion 321 in the circumferential direction, as illustrated in FIGS. 2A, 2B, and 3D to 3F. As a result, curved portion 322 of auxiliary winding groove 32 is formed so as to be curved toward main winding groove 23 in the rotation axis X direction and join main winding groove 23 at closest portion 321. In addition, in the present embodiment, third flange 31 is formed in such a way that the outer edge of third flange 31 in the radial direction is located at the same height as the bottom of auxiliary winding groove 32 at a portion opposite to closest portion 321 in the radial direction (third flange 31 substantially disappears), as illustrated in FIGS. 3A, 3E, and 3F. As a result, wire W can be easily positioned in auxiliary winding groove 32 at the portion opposite to closest portion 321 in the radial direction without wire W having to cross over third flange 31; therefore, wire W can be easily wound around auxiliary winding groove 32 via the portion opposite to closest portion 321 in the radial direction.

As illustrated in FIGS. 2A, 2B, 3A, 3D to 3F, and FIGS. 5B to 5F, third flange 31 includes auxiliary guide portion 311 extending in the radial direction of auxiliary winding groove 32 in such a way that groove depth D2 of curved portion 322 becomes larger than groove depth D1 of closest portion 321 (see in particular, FIGS. 3A and 5B to 5F). Herein, "groove depths D1 and D2" each mean the distance in the radial direction from the outer edge of third flange 31 to the bottom of auxiliary winding groove 32. When, for example, auxiliary guide portion 311 is provided on the side, where wire W is guided toward main winding groove 23, in the circumferential direction of auxiliary winding portion 3 (for example, in the case of auxiliary guide portion 311 on the right side in FIG. 7A), the following is possible: during winding of wire W from auxiliary winding portion 3 to main winding portion 2, wire W can be guided toward main winding groove 23 along curved portion 322 even when wire W is separated from the bottom of curved portion 322 in the radial direction of auxiliary winding groove 32. As wire W has rigidity while having flexibility, the following may occur during winding of wire W from auxiliary winding portion 3 to main winding portion 2: wire W cannot curve so as to correspond to the curvature of curved portion 322, thus floats upward from the bottom of curved portion 322, deviates from the track of curved portion 322, and gets over a portion of third flange 31—the portion located at the position corresponding to closest portion 321—in some cases. However, in the present embodiment, providing third flange 31 with auxiliary guide portion 311 facilitates the curving of wire W along curved portion 322, and prevents wire W from being deviated from the track of curved portion 322 even when wire W may float upward from the bottom of curved portion 322. As a result, wire W is prevented from getting over the portion of third flange 31 located at the position corresponding to closest portion 321, and wire W can be easily guided from auxiliary winding portion 3 to main winding portion 2. Therefore, wire W can be easily wound around main winding portion 2 in pulley 1 of the present embodiment.

Figure 7A:
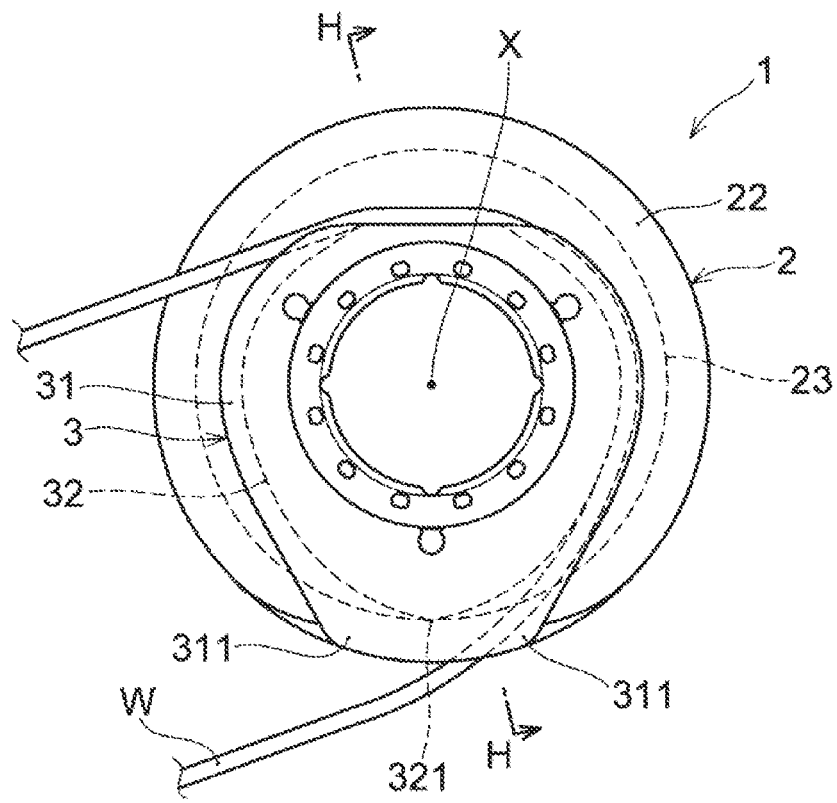
FIG. 7A is a front view illustrating a state in which the pulley is rotated from the state illustrated in FIG. 6A.

In addition, when, for example, auxiliary guide portion 311 is provided on a side opposite to the side, where wire W is guided toward main winding groove 23, in the circumferential direction of auxiliary winding portion 3 (for example, in the case of auxiliary guide portion 311 on the left side in FIG. 7A), the following is possible: wire W can be guided to auxiliary winding groove 32 again without allowing wire W to be separated from auxiliary winding portion 3 in the rotation axis X direction even when wire W gets over the portion of third flange 31 located at the position corresponding to closest portion 321. When wire W is separated from auxiliary winding portion 3 in the rotation axis X direction, it is necessary to wind wire W around auxiliary winding portion 3 again. However, when a state in which wire W is wound at least around auxiliary winding portion 3 can be maintained, the operation of guiding wire W from auxiliary winding groove 32 toward main winding groove 23 can be repeated by continuously rotating pulley 1 or wire W. This configuration can eliminate repetitive winding of wire W around auxiliary winding portion 3, and can easily wind wire W around main winding portion 2.

In addition, when, for example, auxiliary guide portion 311 is provided on either side or each of both sides of closest portion 321 in the circumferential direction of auxiliary winding groove 32 (for example, in the case of auxiliary guide portion 311 on the right side and/or left side in FIG. 7A), the following is possible: wire W can be guided along auxiliary winding groove 32 toward main winding groove 23 without allowing wire W to be separated from auxiliary winding portion 3 in the rotation axis X direction even when the tension of wire W became high and the rotation axis X of pulley 1 is tilted. Therefore, wire W can be easily wound around main winding portion 2 in pulley 1 of the present embodiment.

Auxiliary guide portion 311 is provided at least at one of the positions corresponding to curved portion 322 in order to guide wire W along curved portion 322. In the present embodiment, auxiliary guide portion 311 is provided so as to correspond to first curved portion 322a in curved portions 322 as illustrated in FIGS. 2A, 2B, and 3D. At the portion of curved portion 322 having a large curvature (first curved portion 322a), rigid wire W cannot curve so as to correspond to the curvature of curved portion 322, and is more likely to be deviated from the track of curved portion 322 and float upward. In pulley 1 of the present embodiment, providing auxiliary guide portion 311 so as to correspond to the portion having a large curvature (first curved portion 322a) can more reliably prevent wire W from separating from curved portion 322. In addition, when wire W gets over the portion of third flange 31 located at the position corresponding to closest portion 321, it is highly possible that wire W is separated from auxiliary winding portion 3 at the portion having a large curvature (first curved portion 322a). Therefore, providing auxiliary guide portion 311 so as to correspond to the portion having a large curvature (first curved portion 322a) can further prevent wire W from separating from auxiliary winding portion 3. Wire W can be more reliably guided to main winding groove 23 by providing auxiliary guide portion 311 so as to correspond to the portion (first curved portion 322a) adjacent to closest portion 321, which is the junction of main winding groove 23 and auxiliary winding groove 32, not at a portion away from closest portion 321. In addition, when wire W gets over the portion of third flange 31 located at the position corresponding to closest portion 321, wire W can be returned to auxiliary winding groove 32 more reliably by returning wire W to auxiliary winding groove 32 immediately after the getting over.

Auxiliary guide portion 311 may have any size, so long as auxiliary guide portion 311 extends in the radial direction of auxiliary winding groove 32 in such a way that at least groove depth D2 of curved portion 322 is larger than groove depth D1 of closest portion 321. In the present embodiment, auxiliary guide portion 311 extends at least to a position corresponding to the outer edge of first flange 21 over a predetermined width in the circumferential direction of auxiliary winding portion 3, as illustrated in FIGS. 3A, 5B, 5C, 5E, and 5F. As a result, auxiliary guide portion 311 can guide wire W along curved portion 322 to prevent wire W from deviating from the track of curved portion 322 even when wire W may float upward from the bottom of curved portion 322 to the position corresponding to the outer edge of first flange 21. In addition, when wire W gets over the portion of third flange 31 located at the position corresponding to closest portion 321, wire W can be returned to auxiliary winding groove 32 more reliably. As illustrated clearly in FIG. 3A, auxiliary guide portion 311 is formed in such a way that the groove depth of auxiliary winding groove 32 increases as the distance from closest portion 321 in the circumferential direction of the auxiliary winding groove 32 increases. As a result, wire W can be guided along curved portion 322 more reliably, and wire W getting over the portion of third flange 31 located at the position corresponding to closest portion 321 can be returned to auxiliary winding groove 32 more reliably.

The predetermined width of auxiliary guide portion 311 in the circumferential direction of auxiliary winding portion 3 can be appropriately set so as to satisfy the following: wire W being separated from the bottom of curved portion 322 in the radial direction of auxiliary winding groove 32 can be guided along curved portion 322; or wire W getting over a portion of third flange 31—the portion located at the position corresponding to closest portion 321—can be returned to auxiliary winding groove 32. The predetermined width of auxiliary guide portion 311 is not limited, but can be defined by, for example, angle θ from closest portion 321 about rotation axis X, as illustrated in FIG. 3A. Angle θ is not limited, but is preferably, for example, equal to or less than an angle between a straight line connecting rotation axis X with closest portion 321 and a straight line connecting intersection Y1 with rotation axis X. Intersection Y1 is a point where straight line Y intersects the outer edge of second flange 22 (or first flange 21), where straight line Y is parallel to the straight line connecting rotation axis X with closest portion 321, and is in contact with the outer edge of auxiliary winding portion 3 (third flange 31). Setting angle θ to this angle or less can reduce a portion of third flange 31—the portion higher than the bottom of auxiliary winding groove 32, thereby allowing wire W to be easily wound around auxiliary winding groove 32. A specific preferable maximum value of angle θ is, for example, 55°. From the above viewpoint, angle θ is preferably 55° or less, more preferably 40° or less, and even more preferably 25° or less. Further, angle θ may have any value that is larger than 0°, but may be equal to or more than the minimum angle satisfying the following: wire W can be guided along curved portion 322; or wire W can be returned to auxiliary winding groove 32. The minimum value of angle θ may also change depending on, for example, the size of auxiliary winding groove 32 or the diameter of wire W. A specific preferable minimum value of the angle θ is, for example, 5°. From the above viewpoint, angle θ is preferably 5° or more, more preferably 10° or more, and even more preferably 15° or more.

In the present embodiment, auxiliary guide portions 311 are provided with closest portion 321 therebetween so as to correspond to both sides of closest portion 321 in the circumferential direction of auxiliary winding groove 32, as illustrated in FIGS. 2A, 2B, 3A, and 3D. As auxiliary guide portions 311 are provided so as to correspond to both sides of closest portion 321 in the circumferential direction, wire W can be easily guided from auxiliary winding groove 32 to main winding groove 23 regardless of which direction pulley 1 and wire W are rotated. When wire W gets over the portion of third flange 31 located at the position corresponding to closest portion 321 by rotating pulley 1 and wire W in either direction, wire W can be easily returned to auxiliary winding groove 32. Auxiliary guide portion 311 may be provided in any configuration, so long as the auxiliary guide portion is provided so as to correspond to curved portion 322 adjacent to closest portion 321, and may be provided so as to correspond to one of the sides of closest portions 321 in the circumferential direction.

In the following, the operation of winding wire W from auxiliary winding portion 3 to main winding portion 2 in pulley 1 of the present embodiment will be described in detail in comparison with a pulley of the prior art, with the reference to FIGS. 6A, 6B, 7A to 7C, 8A, 8B, and 9A to 9C. However, the pulley of the present invention is not limited to the following description. Further, in FIGS. 9A to 9C illustrating the pulley of the prior art, the same reference numerals are given to the components corresponding to the components of pulley 1 of the present embodiment for easy understanding, which does not mean that the components with the same reference numeral are the same. Further, FIGS. 9A to 9C are used only for explaining the working effect of pulley 1 of the present embodiment, but do not indicate that all the components included in the illustrated structure are already known.

Figure 6A:
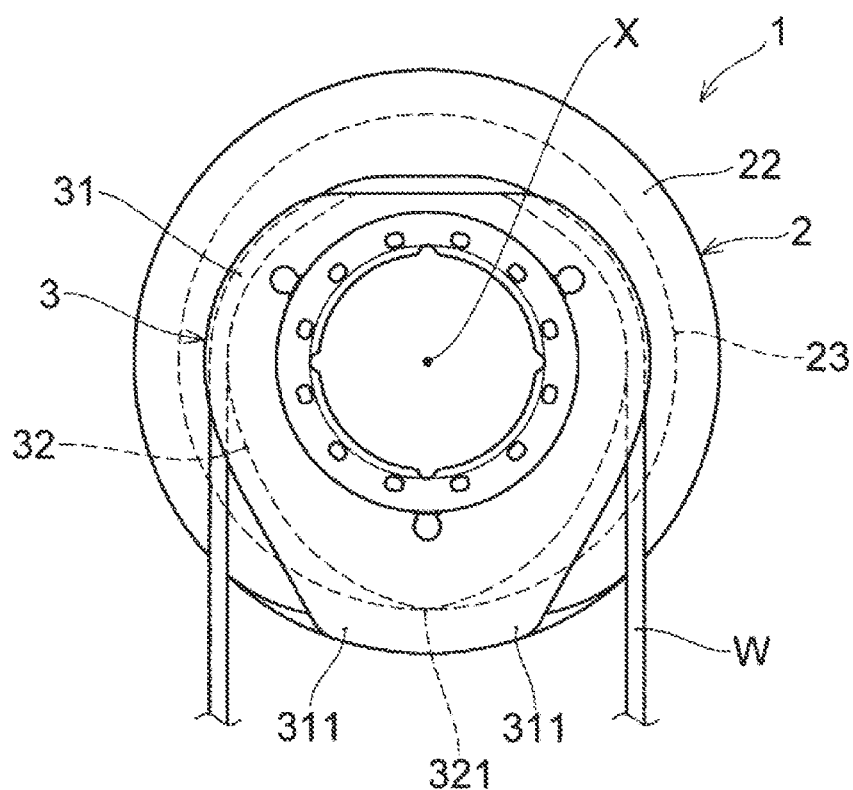
FIG. 6A is a front view illustrating a state in which a wire is temporarily wound around an auxiliary winding portion of the pulley according to the embodiment of the present invention.
Figure 6B:
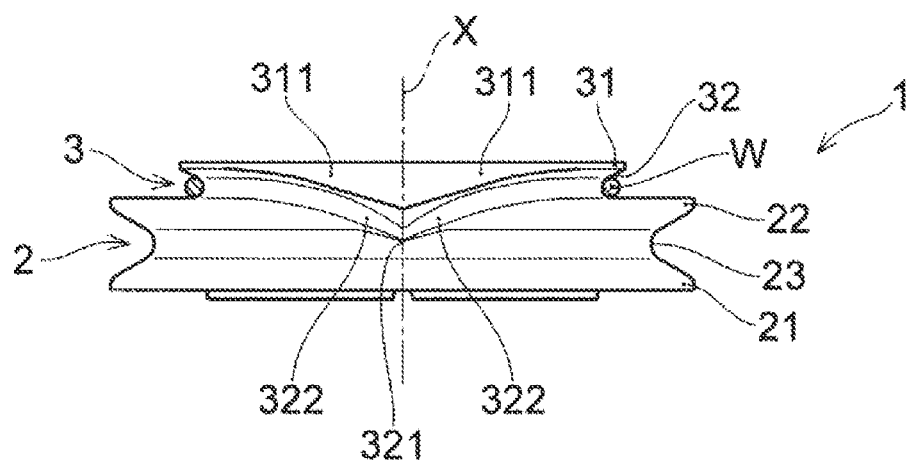
FIG. 6B is a bottom view of FIG. 6A.

As illustrated in FIGS. 6A and 6B, wire W is wound around auxiliary winding groove 32 of auxiliary winding portion 3. At this time, wire W is wound around auxiliary winding portion 3 from the position (upper side in FIG. 6A) on the opposite side in the radial direction from the position where the auxiliary winding portion joins main winding portion 2. At the position—on the opposite side in the radial direction from the position adjacent to main winding portion 2—in auxiliary winding portion 3, the edge of third flange 31 in the radial direction has substantially the same height as the bottom of auxiliary winding groove 32 (see also FIGS. 3A, 3E, and 3F). Therefore, when wire W is wound around auxiliary winding groove 32, wire W does not have to get over third flange 31, and thus wire W can be easily wound around auxiliary winding groove 32.

Figure 7B:
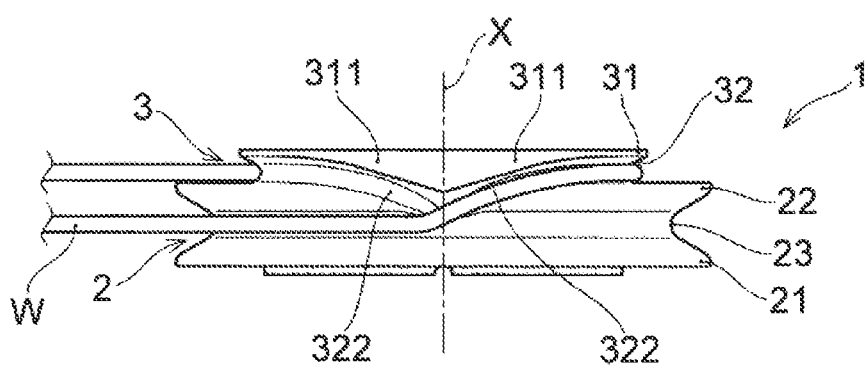
FIG. 7B is a bottom view of FIG. 7A.
Figure 7C:
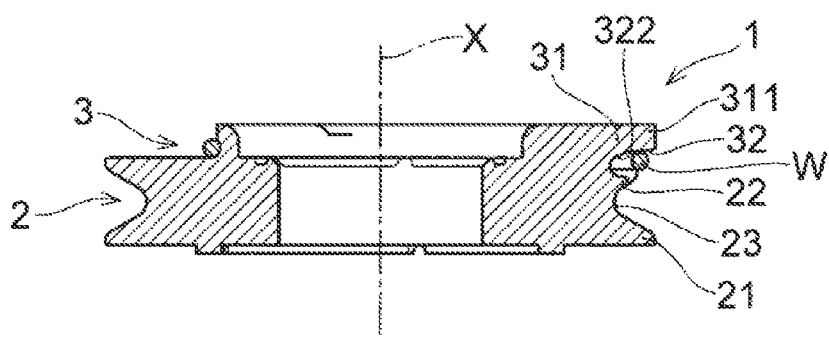
FIG. 7C is a cross-sectional view taken along line H-H of FIG. 7A.

After wire W is wound around auxiliary winding groove 32, pulley 1 is rotated counterclockwise about rotation axis X in front view as illustrated in FIGS. 7A to 7C. At this point, guide rails GR1 and GR2 provided with pulley 1 are already attached to an attachment target such as a door panel (not illustrated) of a vehicle. FIG. 7A illustrates the position of rotated pulley 1 at the same position as in FIG. 6A for easy comparison with other states, thus illustrates as if wire W is rotated clockwise with respect to pulley 1. Due to the rotation, wire W reaches curved portion 322 of auxiliary winding groove 32 and is guided toward closest portion 321 along the extending direction of curved portion 322. At this time, wire W is curved toward main winding groove 23 (downward in FIG. 7B) in the rotation axis X direction along the extending direction of curved portion 322. For example, as illustrated in FIGS. 9A to 9C, the following may occur in a pulley of the prior art: wire W cannot be curved so as to correspond to the curvature of curved portion 322, floats upward from the bottom of curved portion 322 as illustrated in FIG. 9C, deviates from the track of curved portion 322, and gets over the portion of third flange 31 located at the position corresponding to closest portion 321 in some cases as illustrated in FIG. 9B. In such a case, further rotating of pulley 1 may cause separation of wire W from auxiliary winding portion 3. However, as third flange 31 is provided with auxiliary guide portion 311 in pulley 1 of the present embodiment, the following is possible even when wire W may float upward from the bottom of curved portion 322, as illustrated in FIG. 7C: auxiliary guide portion 311 prevents wire W from deviating from the track of curved portion 322, facilitates the curving of wire W along curved portion 322, and guides wire W from auxiliary winding groove 32 to main winding groove 23 as illustrated in FIG. 7B. Even if wire W gets over the portion of third flange 31 located at the position corresponding to closest portion 321, auxiliary guide portion 311 on the left side of FIG. 7A guides wire W to auxiliary winding groove 32 again when pulley 1 is continuously rotated. Therefore, the operation of guiding wire W from auxiliary winding groove 32 toward main winding groove 23 can be repeated by continuously rotating pulley 1.

Figure 8A:
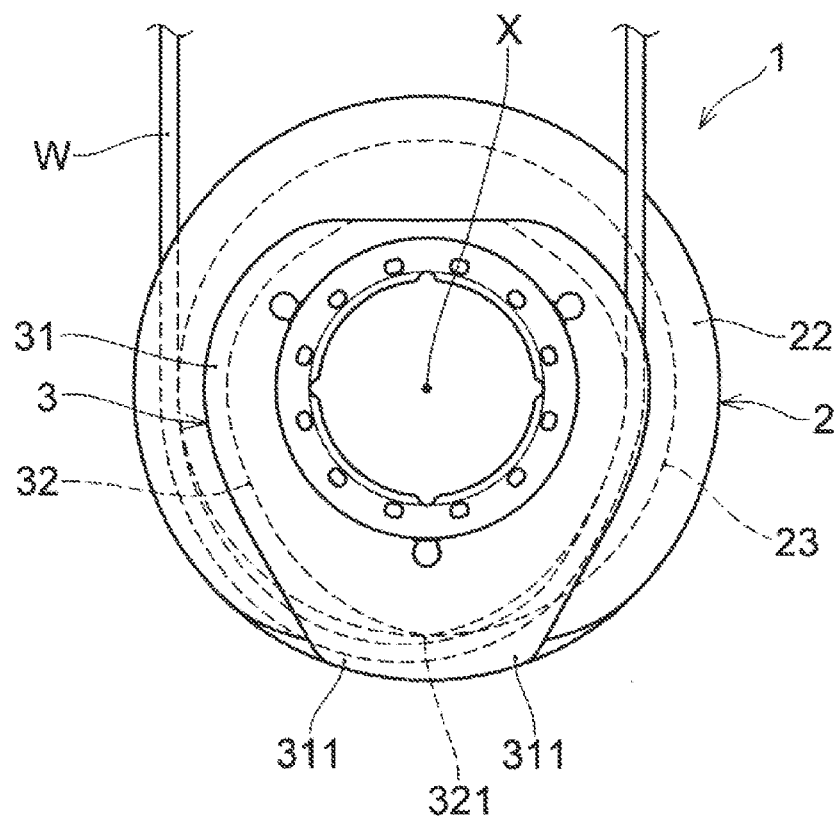
FIG. 8A is a front view illustrating a state in which the pulley is rotated from the state illustrated in FIG. 7A.
Figure 8B:
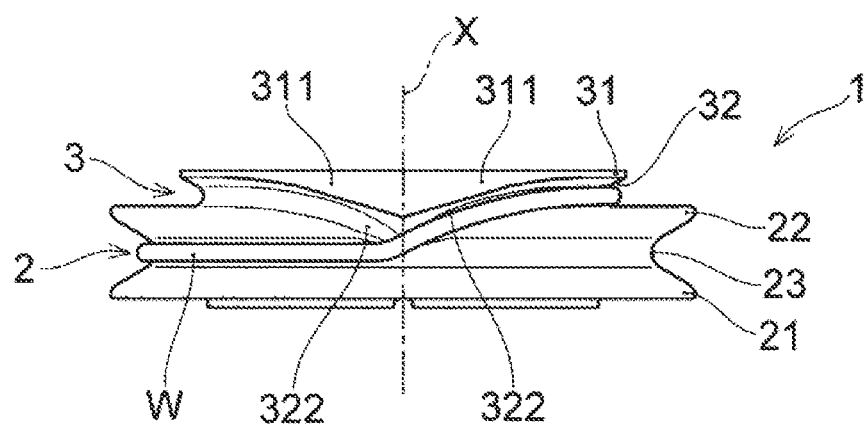
FIG. 8B is a bottom view of FIG. 8A.
Figure 9A:
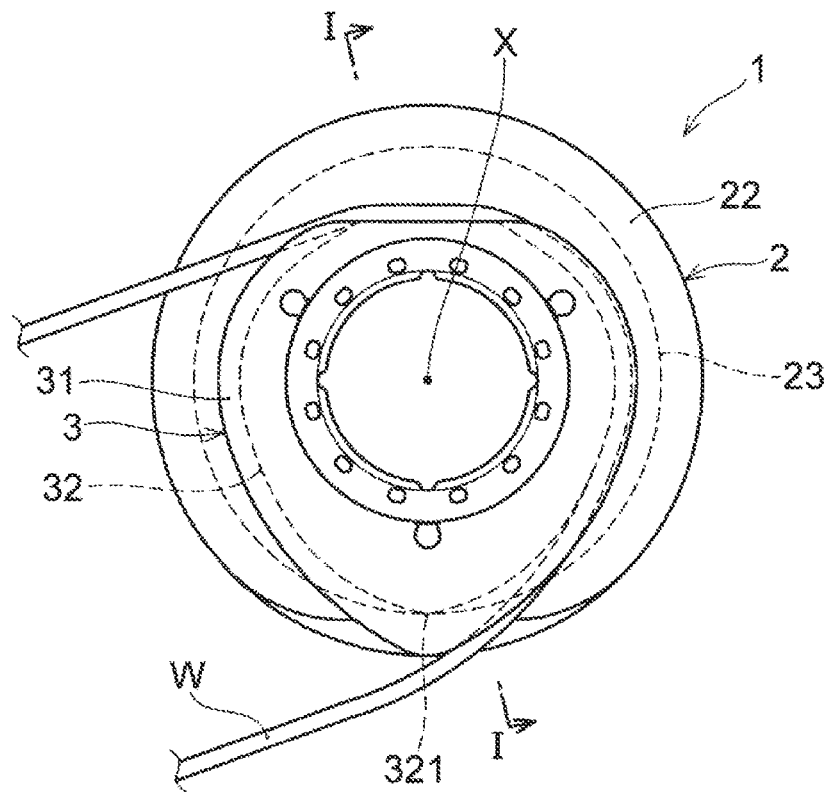
FIG. 9A is a front view illustrating a conventional pulley in a state in which the positional relationship of the pulley with the wire is the same as in the state illustrated in FIG. 7A.
Figure 9B:
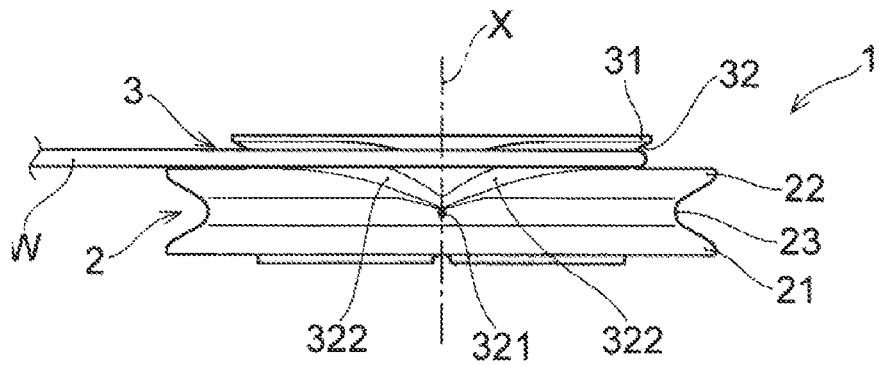
FIG. 9B is a bottom view of FIG. 9A.
Figure 9C:
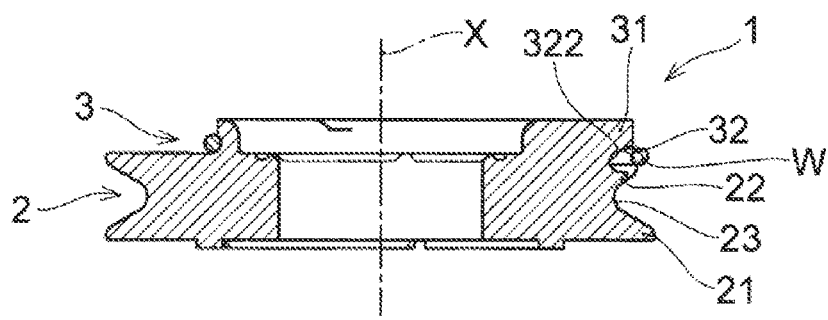
FIG. 9C is a cross-sectional view taken along line I-I of FIG. 9A.

After wire W is guided to closest portion 321 via curved portion 322 of auxiliary winding groove 32, pulley 1 is further rotated counterclockwise about rotation axis X in front view as illustrated in FIGS. 8A and 8B. As a result, wire W guided to main winding groove 23 is guided along main winding groove 23 and wound around main winding groove 23. In the pulley of the prior art, meanwhile, wire W gets over the portion of third flange 31 located at the position corresponding to closest portion 321, and separates from auxiliary winding groove 32 without being guided by main winding groove 23.

When pulley 1 is further rotated counterclockwise in front view from the state illustrated in FIGS. 8A and 8B, wire W is guided along main winding groove 23, and eventually wire W to be wound around pulley 1 is all wound around main winding groove 23. As described above, in pulley 1 of the present embodiment, wire W can be easily wound around main winding groove 23 of main winding portion 2.

REFERENCE SIGNS LIST

1 Pulley
2 Main winding portion
21 First flange
22 Second flange
23 Main winding groove
3 Auxiliary winding portion
31 Third flange
311 Auxiliary guide portion
32 Auxiliary winding groove
321 Closest portion
322 Curved portion
322a First curved portion
322b Second curved portion
CP1 First moving member
CP2 Second moving member
D1 Groove depth of closest portion
D2 Groove depth of curved portion
DR Drive section
DR1 Motor
DR2 Drum
GR1 First guide rail
GR2 Second guide rail
L Raising and lowering direction
OC Outer casing
W Wire
W1 First wire
W2 Second wire
W3 Third wire
WR Window regulator
X Rotation axis
Y Straight line
Y1 Intersection
θ Angle from closest portion

What is claimed is:

1. A pulley around which a wire is windable and which is rotatable about a rotation axis, the pulley comprising:
   a main winding portion including a first flange, a second flange, and a main winding groove in an annular shape formed between the first flange and the second flange, wherein the wire is windable around the main winding groove; and
   an auxiliary winding portion including the second flange, a third flange, and an auxiliary winding groove in an annular shape formed between the second flange and the third flange, wherein the wire is windable around the auxiliary winding groove, and the auxiliary winding groove has a total peripheral length shorter than that of the main winding groove, wherein:

the auxiliary winding groove includes a closest portion that is closest to the main winding groove in a radial direction of the main winding groove, in a portion adjacent to the closest portion of the auxiliary winding groove, the auxiliary winding groove extends inward in the radial direction of the main winding groove as a distance from the closest portion increases, the auxiliary winding groove further includes a curved portion that is curved toward the main winding groove in the portion adjacent to the closest portion in such a way that the curved portion joins the main winding groove at the closest portion, and the third flange includes an auxiliary guide portion extending in a radial direction of the auxiliary winding groove in such a way that a groove depth of the curved portion becomes larger than a groove depth of the closest portion.

2. The pulley according to claim 1, wherein:
the auxiliary guide portion extends at least to a position corresponding to an outer edge of the first flange over a predetermined width in a circumferential direction of the auxiliary winding portion.

3. The pulley according to claim 1, wherein:
the curved portion includes a first curved portion and a second curved portion, the first curved portion being adjacent to the closest portion in a circumferential direction of the auxiliary winding groove, the second curved portion being adjacent to the first curved portion on a side opposite to the closest portion in the circumferential direction of the auxiliary winding groove;

the first curved portion is curved with a curvature larger than that of the second curved portion; and the auxiliary guide portion is provided so as to correspond to the first curved portion.

4. The pulley according to claim 1, wherein:
the auxiliary guide portion comprises a plurality of auxiliary guide portions that are provided with the closest portion therebetween so as to correspond to both sides of the closest portion in a circumferential direction of the auxiliary winding groove.

5. A window regulator, comprising: the pulley according to claim 1 and further comprising:

a drive section;

the wire being driven by the drive section;

a moving member to which the wire is connected and a window glass is attachable;

a guide rail for guiding the moving member; and the pulley being rotatably attached to the guide rail and allowing winding of the wire around the pulley.

* * * * *